US012718626B2

(12) United States Patent
Huncha et al.

(10) Patent No.: US 12,718,626 B2
(45) Date of Patent: Aug. 25, 2026

(54) SERVICE ISSUE FORECASTING THAT ADAPTS TO AIRCRAFT OPERATIONS

(71) Applicant: HONEYWELL INTERNATIONAL INC., Charlotte, NC (US)

(72) Inventors: Pradeep Huncha, Bangalore (IN); Sreenivasan Govindillam, Bangalore (IN); David Woodcock, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 395 days.

(21) Appl. No.: 18/311,702

(22) Filed: May 3, 2023

(65) Prior Publication Data

US 2024/0308692 A1 Sep. 19, 2024

(30) Foreign Application Priority Data

Mar. 17, 2023 (IN) ............................ 202311018134

(51) Int. Cl.
*G07C 5/00* (2006.01)
*B64F 5/40* (2017.01)

(52) U.S. Cl.
CPC ................ *G07C 5/006* (2013.01); *B64F 5/40* (2017.01)

(58) Field of Classification Search
CPC .................................. G07C 5/006; B64F 5/40
See application file for complete search history.

(56) References Cited

U.S. PATENT DOCUMENTS

| | | | | |
|---|---|---|---|---|
| 8,126,597 B2 | 2/2012 | Bailly et al. | | |
| 10,372,872 B2 | 8/2019 | Brelje et al. | | |
| 2006/0097854 A1* | 5/2006 | Basu | ...................... | G07C 5/006 340/425.5 |
| 2017/0011635 A1* | 1/2017 | Whitlow | .................. | G08G 5/21 |

(Continued)

FOREIGN PATENT DOCUMENTS

| | | | | |
|---|---|---|---|---|
| EP | 2629201 A1 | 8/2013 | | |
| WO | WO-2011014089 A1 * | 2/2011 | ............. | G06Q 10/08 |

OTHER PUBLICATIONS

WO2011014089A1 Translation Google Patents with appended Line Numbers (Year: 2011).*

(Continued)

*Primary Examiner* — Rachid Bendidi
*Assistant Examiner* — Rafael Velasquez Vanegas
(74) *Attorney, Agent, or Firm* — Ingrassia Fisher & Lorenz LLP

(57) ABSTRACT

Methods and systems are provided for automatically forecasting service issues for an aircraft. The method accesses a service issue database that contains retrievable data regarding service issues for the aircraft. An operation flight plan for the aircraft is accessed including specific planned flight operations. The mission state of the aircraft is predicted based on the specific planned flight operations. A correlation is generated between the specific planned flight operations and any related service issues stored in the database. An advisory is generated for a crewmember of the aircraft that details any flight deck impact, avoidance procedures and mitigation procedures for the related service issues. The advisory, the flight deck impact, avoidance procedures and mitigation procedures are displayed in a graphic format to an aircrew member.

16 Claims, 5 Drawing Sheets

(56) References Cited

U.S. PATENT DOCUMENTS

| | | | | |
|---|---|---|---|---|
| 2017/0236075 | A1* | 8/2017 | Shi | G06T 7/0008 701/31.4 |
| 2019/0102957 | A1* | 4/2019 | Huber | G06Q 50/40 |
| 2021/0090361 | A1* | 3/2021 | Sharma | G07C 5/0841 |
| 2021/0334675 | A1* | 10/2021 | Nakhjavani | G06Q 10/20 |
| 2021/0383706 | A1 | 12/2021 | Gibbons, II et al. | |
| 2022/0343771 | A1* | 10/2022 | Schwindt | G08G 5/34 |

OTHER PUBLICATIONS

Honeywell Service Information Letter, revised Apr. 3, 2019, https://performanceaccel.honeywell.com/services/pilotsapp.svc/document?itemid=%7B6E7F72DC-8BE7-4D8A-8430-0541A6282AF2%7D (Year: 2017).*

XP93149259; Anonymous: "Considering Aircraft Service Information—Steven Bentley www.sassofia.com—SASSofiaSasSofia", Jan. 4, 2013, Retrieved from Internet: URL:https://sassofia.com/blog/considering-aircraft-service-information-steven-bentley-www-sassofia-com/.

XP93149260; Honeywell: "Service Information Lettter"; May 31, 2017 Retrieved from Internet: URL:https//performanceaccel.honeywell.com/services/pilotsapp.svc/document?itemid={6E7F72DC-8BE7-4D8A-8430-0541A6282AF2}.

* cited by examiner

SERVICE ISSUE FORECASTING THAT ADAPTS TO AIRCRAFT OPERATIONS

TECHNICAL FIELD

The present invention generally relates to aircraft operations and maintenance, and more particularly relates to service issue forecasting that adapts to aircraft operations.

BACKGROUND

Aircraft maintenance typically involves a wide variety of products to manage that make aviation, communication and navigation efficient. It is vital to address the in service issues efficiently and effectively. Critical in service issues result in Aircraft On Ground (AOG) situations which affect aircraft operations. Typically all in service issues are searched by the crew or dispatch personnel while attempting to determine the best workaround or avoidance procedures. Hence, there is a need for aircraft service issue forecasting that adapts to operations.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for automatically forecasting service issues for an aircraft. The method comprises: accessing a service issue database that contains retrievable data regarding service issues for the aircraft; accessing an operation flight plan for the aircraft including specific planned flight operations; predicting the mission state of the aircraft based on the specific planned flight operations; generating a correlation between the specific planned flight operations and any related service issues stored in the database; generating an advisory for a crewmember of the aircraft that details any flight deck impact, avoidance procedures and mitigation procedures for the related service issues; and displaying the advisory, the flight deck impact, avoidance procedures and mitigation procedures in a graphic format to an aircrew member.

A system is provided for automatically forecasting service issues for an aircraft. The system comprises: a database that contains retrievable data regarding service issues for the aircraft; a computer processor and a non-transitory data memory storage media that, accesses an operation flight plan for the aircraft including specific planned flight operations, predicts the mission state of the aircraft based on the specific planned flight operations, generates a correlation between the specific planned flight operations and any related service issues stored in the database, and generates an advisory for a crewmember of the aircraft that details any flight deck impact, avoidance procedures and mitigation procedures for the related service issues; and a display that shows the advisory, the flight deck impact, avoidance procedures and mitigation procedures in a graphic format to an aircrew member.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Methods and systems have been developed for automatically forecasting service issues for an aircraft. The method accesses a service issue database that contains retrievable data regarding service issues for the aircraft. An operation flight plan for the aircraft is accessed including specific planned flight operations. The mission state of the aircraft is predicted based on the specific planned flight operations. A correlation is generated between the specific planned flight operations and any related service issues stored in the database. An advisory is generated for a crewmember of the aircraft that details any flight deck impact, avoidance procedures and mitigation procedures for the related service issues. The advisory, the flight deck impact, avoidance procedures and mitigation procedures are displayed in a graphic format to an aircrew member.

Figure 1A:
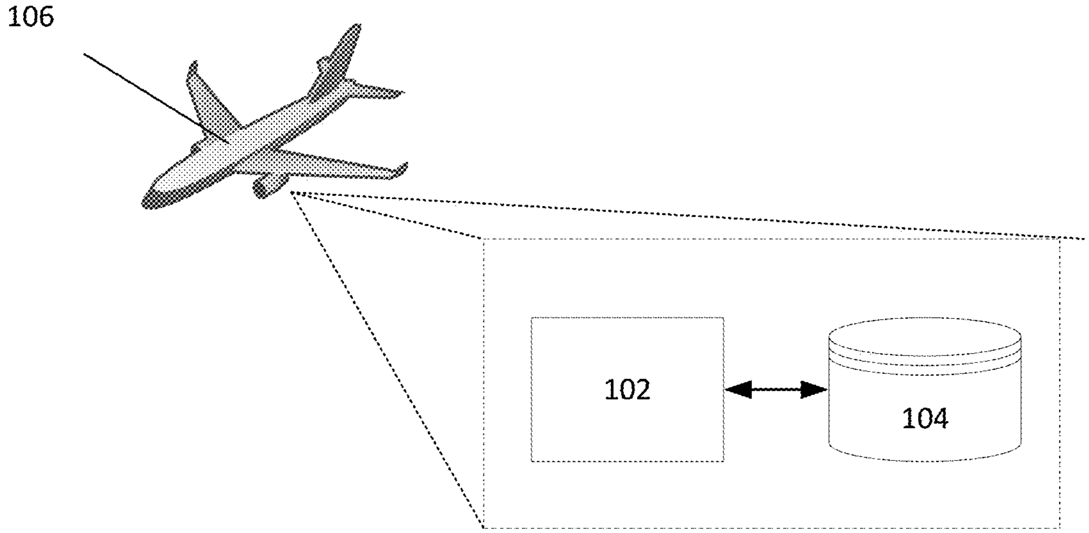
FIG. 1A shows a diagram of an aircraft that contains an onboard computing device along with an onboard database in accordance with one embodiment.
Figure 1B:
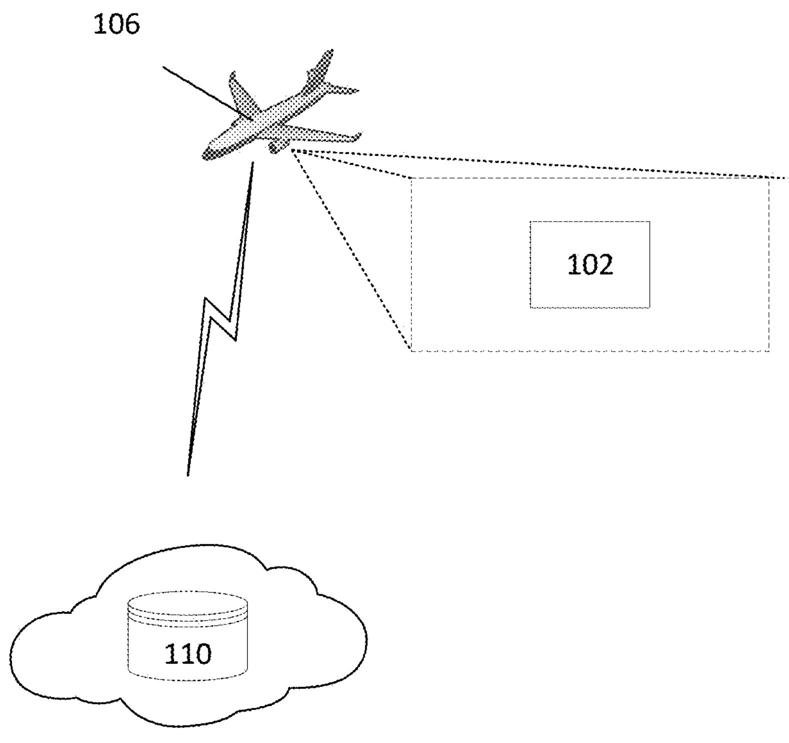
FIG. 1B shows a diagram of an aircraft that contains an onboard computing device along with an off board database in accordance with one embodiment.

Turning now to FIG. 1A, a diagram 100 is shown of an aircraft 106 that contains an onboard computing device 102 along with an onboard database 104 that is accessed by the computing device 102 in accordance with one embodiment. In alternative embodiments, the database 104 may be integrated as part of the computing device 102. In still other embodiments as shown in FIG. 1B, the database 110 may be located off board the aircraft on the ground or in the cloud and connected to the computing device 102 via a communications data link. In some embodiments, the database 110 may include a navigation database as well as performance characteristics database of the aircraft 106 for retrieval and use by the computing device 102.

Figure 2:
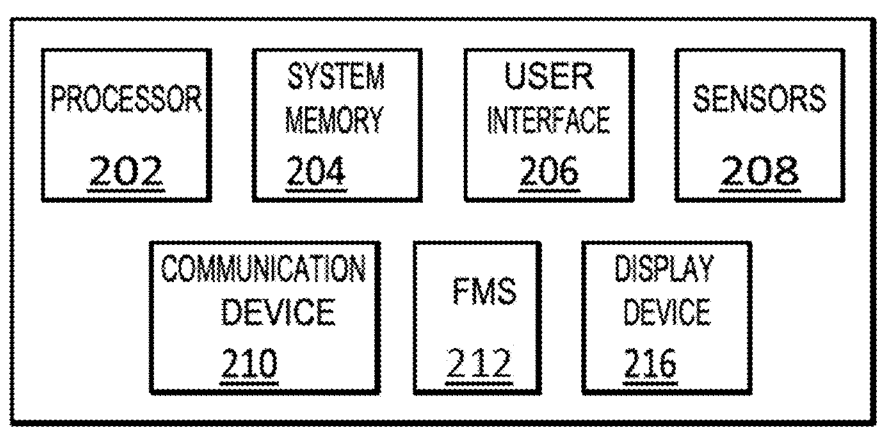
FIG. 2 shows a functional block diagram of a computing device in accordance with one embodiment.

FIG. 2 is a functional block diagram of a computing device 200, in accordance with the disclosed embodiments. It should be noted that the computing device 200 can be implemented with the computing device 102 depicted in FIGS. 1A and 1B. In this regard, the computing device 200 shows certain elements and components of the computing device 102 in more detail.

The computing device 200 generally includes, without limitation: a processor 202; system memory 204; a user interface 206; a plurality of sensors 208; a communication device 210; a flight management system (FMS) 212; and a display device 216. These elements and features of the computing device 200 may be operatively associated with one another, coupled to one another, or otherwise configured to cooperate with one another as needed to support the desired functionality. For case of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The FMS 212, as is generally known, is a specialized computer that automates a variety of in-flight tasks such as in-flight management of the flight plan. Using various sensors such as global positioning system (GPS), the FMS 212 determines the aircraft's position and guides the aircraft along its flight plan using its navigation database. From the cockpit, the FMS 212 is normally controlled through a visual display device such as a control display unit (CDU) which incorporates a small screen, a keyboard or a touchscreen. The FMS 212 displays the flight plan and other critical flight data to the aircrew during operation.

The FMS 212 may have a built-in electronic memory system that contains a navigation database. The navigation database contains elements used for constructing a flight plan. In some embodiments, the navigation database may be separate from the FMS 212 and located onboard the aircraft while in other embodiments the navigation database may be located on the ground and relevant data provided to the FMS 212 via a communications link with a ground station. The navigation database used by the FMS 212 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 212 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 212 to modify the plight flight plan before takeoff or even while in flight for variety of reasons. Such changes may be entered via the CDU. Once in flight, the principal task of the FMS 212 is to accurately monitor the aircraft's position. This may use a GPS, a VHF omnidirectional range (VOR) system, or other similar sensor in order to determine and validate the aircraft's exact position. The FMS 212 constantly cross checks among various sensors to determine the aircraft's position with accuracy.

Additionally, the FMS 212 may be used to perform advanced vertical navigation (VNAV) functions. The purpose of VNAV is to predict and optimize the vertical path of the aircraft. The FMS 212 provides guidance that includes control of the pitch axis and of the throttle of the aircraft. In order to accomplish these tasks, the FMS 212 has detailed flight and engine model data of the aircraft. Using this information, the FMS 212 may build a predicted vertical descent path for the aircraft. A correct and accurate implementation of VNAV has significant advantages in fuel savings and on-time efficiency.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Present embodiments have a capability of filtering a service issue database within an operational context to manage service issues for an aircraft. A graphical representation (e.g., video, image) aids in faster avoidance or work-around of any issues. This is also very beneficial in single pilot operations in order to reduce and optimize the pilot workload.

Figure 3:
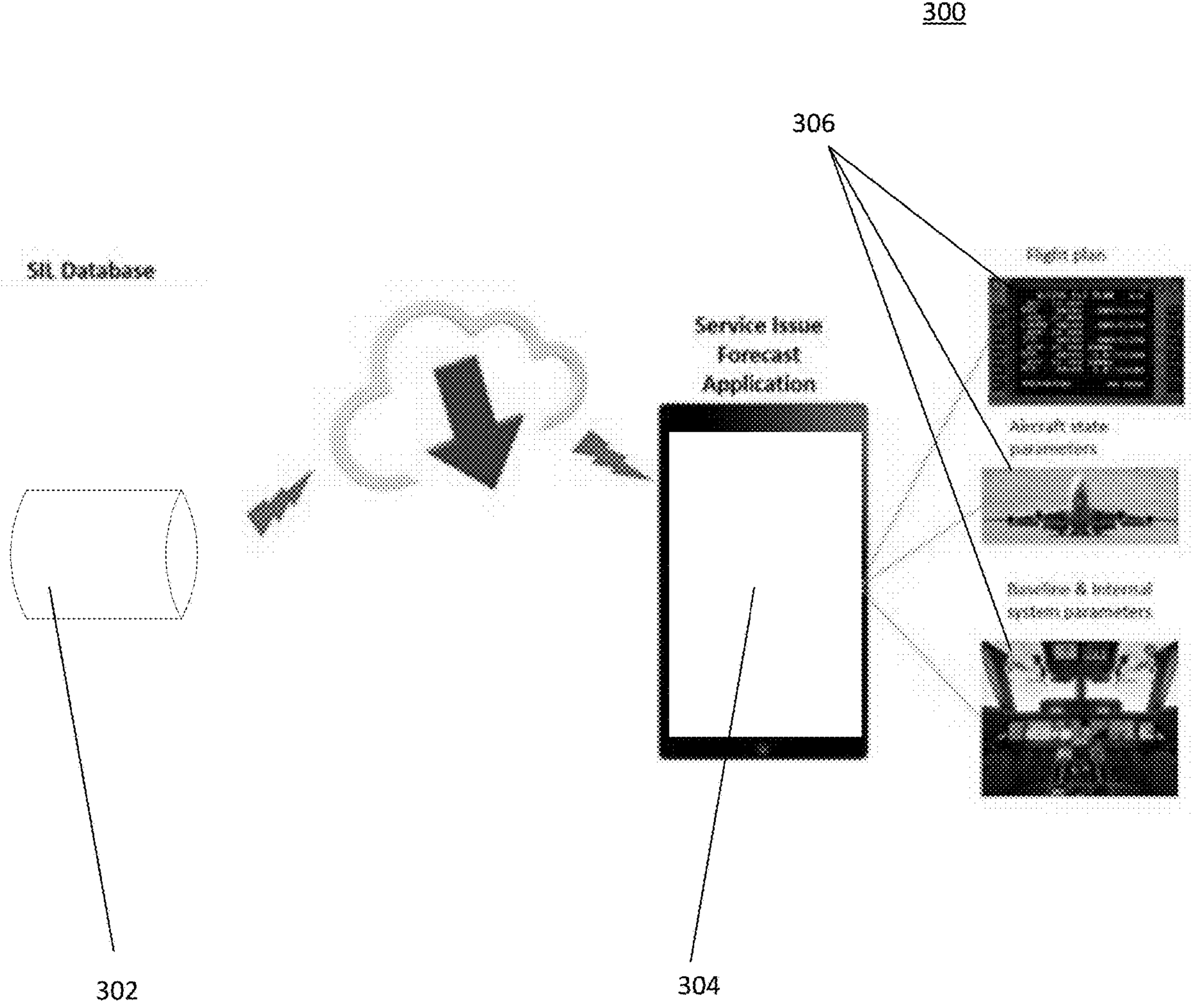
FIG. 3 shows a block diagram of a system for automatically forecasting service issues for an aircraft in accordance with one embodiment.

Turning now to FIG. 3, a block diagram 300 is shown of a system for automatically forecasting service issues for an aircraft in accordance with one embodiment. The system has service issue database 302 which contains digitized service information for an aircraft such as a service information letter (SIL), a service bulletin or other service information and documents related to the aircraft. A SIL is normally used to pass information along to the industry from the manufacturer and are not mandatory. This document, or a similarly named one, is used by manufacturers of aircraft, engines or other components to communicate details of advisory action or other useful information about the products which may enhance safety, reliability or reduce repetitive costs. A SIL usually contain impacted baseline details, describes the issue with flight deck impact, conditions required for issue to occur, avoidance and mitigation procedures along with associated video/image files. In contrast, "Service Bulletins" are highlighting more important service difficulties found in the field. Service bulletins are automatically sent to the owner of an aircraft by the aircraft or component manufacturer.

An operation flight plan for the aircraft including specific planned flight operations is accessed and extracted 306. The mission state of the aircraft is predicted based on the specific planned flight operations. The Service Issue Forecast application 304 generates any correlation between the specific planned flight operations 306 and any related service issues stored in the database 302. If any correlation is found, an advisory is generated for a crewmember of the aircraft that details any flight deck impact, avoidance procedures and mitigation procedures for the related service issues. Any advisory that is generated is displayed by the application 304 along with any flight deck impact, avoidance procedures and mitigation procedures in a graphic format to an aircrew member.

The flight operations are extracted and accessed using cockpit connectivity of the aircraft. The mission state of the aircraft is predicted per the cockpit operations. Corelating the mission state of the aircraft is done using product baseline (i.e., software, hardware) in comparison with the information listed in the database. Any context sensitivity of the current/predicted mission states are also corelated to the database. If there is potential occurrence of the issue, the associated flight deck impact, avoidance/workaround procedures are also extracted from the database. Any advisory is depicted graphically (with videos, images, etc. so that the crew is fully aware of the issue and feasible workarounds. In alternative embodiments, service issue forecasting uses flight plans that are filed for the aircraft. The filed flight plans typically include: departure procedures; airways; arrival/approach procedures; etc. This data may be used to predict the probability of the occurrence of a service issue. In other embodiments, the SILS may be filtered to identify specific operational concerns and issues. This will help target the forecast.

Figure 4:
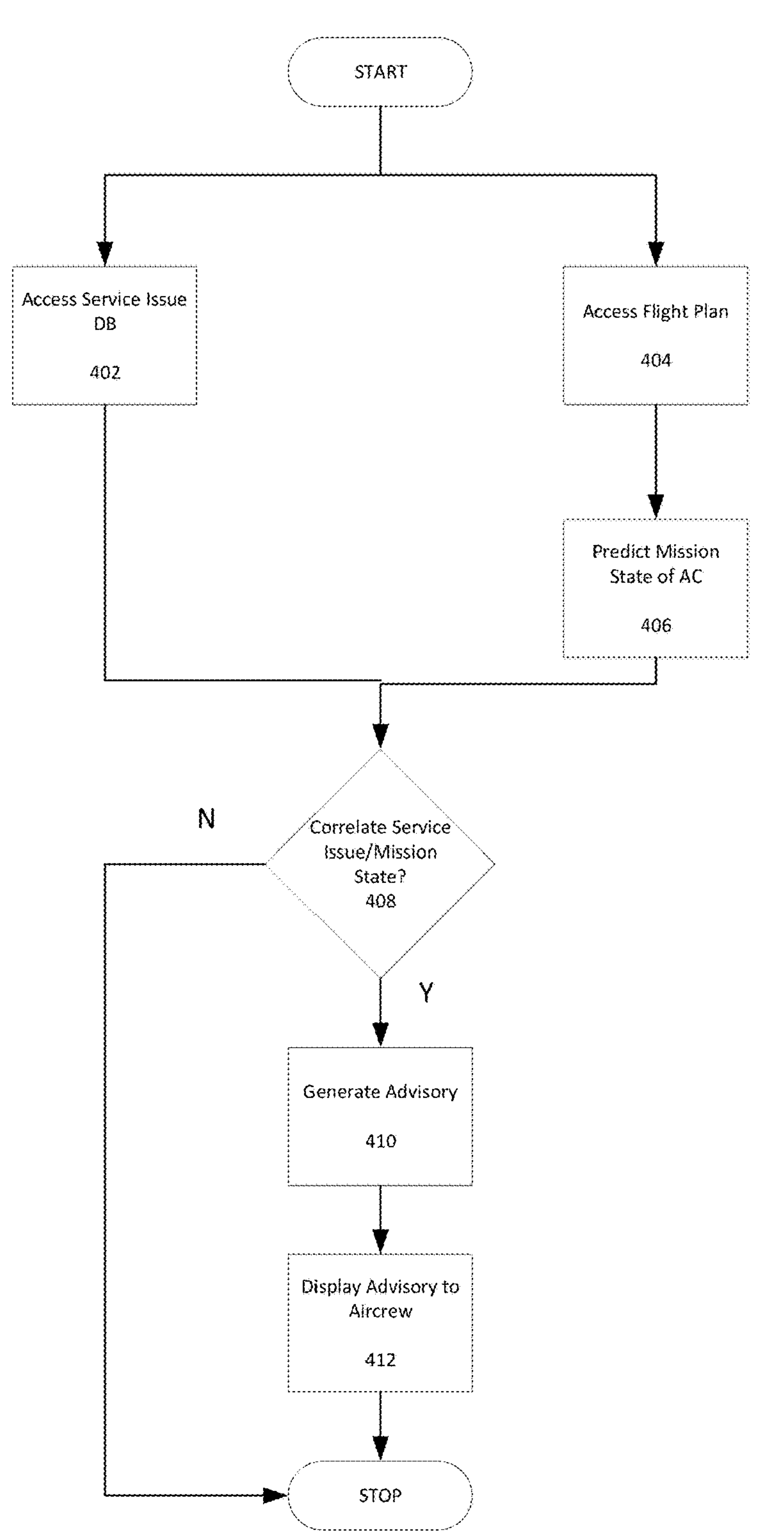
FIG. 4 shows a flowchart of a method for automatically forecasting service issues for an aircraft in accordance with one embodiment.

Turning now to FIG. 4, a flowchart 400 is shown of a method for automatically forecasting service issues for an aircraft in accordance with one embodiment. First, a service issue database is accessed 402 that contains retrievable data regarding service issues for the aircraft. Also, an operation flight plan is accessed 404 for the aircraft that includes specific planned flight operations. The mission state of the aircraft is predicted 406 based on the specific planned flight operations. Any correlation is determined 408 between the specific planned flight operations and any related service issues stored in the database. If a correlation is found, an advisory is generated 410 for a crewmember of the aircraft that details any flight deck impact, avoidance procedures and mitigation procedures for the related service issues. The advisory is displayed 412 along with the flight deck impact, avoidance procedures and mitigation procedures in a graphic format to an aircrew member.

Is should be apparent that various embodiments have the advantage of providing automated service advisories based on operational and mission state context. As a result, a pilot doesn't have to review every service document and hence workload is reduced. Additionally, Increased awareness is provided for pilot about the probable occurrence of the known service issues. This proactive measure assists in reducing AOG issues.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for automatically forecasting service issues for an aircraft, comprising:

automatically accessing, by at least one processor on the aircraft, a service issue database storing data of a plurality of service issues associated with the aircraft;

automatically accessing, by the at least one processor, an operation flight plan for the aircraft;

automatically extracting, by the at least one processor using cockpit connectivity of the aircraft, specific planned flight operations of the operation flight plan;

automatically determining, by the at least one processor, a predicted mission state of the aircraft based on the automatically accessed operation flight plan and the extracted specific planned flight operations;

generating, by the at least one processor, a correlation between the specific planned flight operations and any related service issues stored in the database;

automatically filtering, by the at least one processor, the plurality of service issues to exclude service issues that are incompatible with the predicted mission state of the aircraft to identify a filtered set of service issues associated with the predicted mission state;

automatically retrieving, by the at least one processor on the aircraft and retrieved from the service issue database, avoidance procedures to have an aircrew member of the aircraft avoid an issue of the service issues in the filtered set, and mitigation procedures to have the aircrew member compensate for the issue of the service issues in the filtered set;

generating, by the at least one processor on the aircraft, an advisory for the crewmember of the aircraft that details any flight deck impact, the avoidance procedures, and the mitigation procedures for the related service issues of the filtered set; and displaying the advisory, the flight deck impact, the avoidance procedures, and the mitigation procedures as a graphic image display to an aircrew member within the cockpit of the aircraft using at least one video display or an image display.

2. The method of claim 1, where the service issues for the aircraft comprises a service bulletin.

3. The method of claim 2, where the service bulletin is from an original equipment manufacturer (OEM).

4. The method of claim 1, where the service issues for the aircraft comprises a service information letter (SIL).

5. The method of claim 4, where the SIL is from an original equipment manufacturer (OEM).

6. The method of claim 4, where the SIL comprises baseline details regarding the service issues.

7. The method of claim 4, where the SIL comprises issue descriptions regarding the service issues.

8. The method of claim 4, where the SIL comprises conditions during occurrence regarding the service issues.

9. The method of claim 4, where the SIL comprises flight deck impact regarding the service issues.

10. The method of claim 1, where the data regarding the service issues for the aircraft comprises a filed flight plan, where the filed flight plan comprises departure procedures, airways, approach procedures, and arrival procedures for the aircraft.

11. The method of claim 1, where the display in a graphic format comprises a video display.

12. The method of claim 1, where the specific planned flight operations of the aircraft comprise single pilot operations.

13. A system for automatically forecasting service issues for specific planned flight operations of an aircraft, comprising:

a database that contains retrievable data regarding service issues for the aircraft;

a computer processor on the aircraft communicatively coupled to a non-transitory data memory storage media and that automatically:

accesses an operation flight plan for the aircraft that includes the specific planned flight operations, extracts the specific planned flight operations using cockpit connectivity of the aircraft, predicts the mission state of the aircraft based on the specific planned flight operations, generates a correlation between the mission state and the specific planned flight operations to related service issues stored in the database, filters the service issues to exclude service issues that are incompatible with the predicted mission state of the aircraft to identify a filtered set of service issues associated with the predicted mission state, automatically retrieves, from the service issue database, avoidance procedures to have an aircrew member of the aircraft avoid an issue of the service issues in the filtered set, and mitigation procedures to have the aircrew member compensate for the issue of the service issues in the filtered set, and generates an advisory for a crewmember of the aircraft that details any flight deck impact, avoidance procedures, and mitigation procedures for the related service issues; and a display in a cockpit of the aircraft that shows the advisory, the flight deck impact, avoidance procedures, and mitigation procedures as a graphic image display to an aircrew member.

14. The system of claim 13, where the retrievable data regarding service issues for the aircraft comprises a service bulletin.

15. The system of claim 13, where the retrievable data regarding service issues for the aircraft comprises a service information letter (SIL).

16. The system of claim 15, where the SIL contains details of service issues for the aircraft comprising:

baseline details, issue description, flight deck impact, and conditions during occurrence.

* * * * *